United States Patent [19]
Worden

[11] 3,984,623
[45] Oct. 5, 1976

[54] CABLE SPLICE HOUSING
[76] Inventor: Owen W. Worden, 2809 Uplands Crescent, Abbotsford, British Columbia, Canada
[22] Filed: Dec. 2, 1974
[21] Appl. No.: 528,930

[30] Foreign Application Priority Data
Oct. 23, 1974 Canada .................................. 212129

[52] U.S. Cl. ........................... 174/138 F; 174/77 R; 174/87; 174/93
[51] Int. Cl.² ..................... H02G 15/04; H01R 5/12
[58] Field of Search .............................. 174/91-93, 174/76, 77 R, 87, 88 R, 74 A, 138 F; 277/209, 4; 339/114, 115 R, 115 C, 116 R, 116 C, 213 R

[56] References Cited
UNITED STATES PATENTS

| | | |
|---|---|---|
| 2,428,884 | 10/1947 | Lefran ...................... 174/77 R UX |
| 2,621,228 | 12/1952 | Tompers ............................. 174/93 |
| 2,906,810 | 9/1959 | D'Ascoli .............................. 174/87 |
| 3,518,358 | 6/1970 | Brown ............................. 174/93 X |
| 3,585,275 | 6/1971 | Gillemot et al. ..................... 174/76 |
| 3,725,581 | 4/1973 | Gillemot et al. .............. 174/77 R X |

Primary Examiner—Laramie E. Askin
Attorney, Agent, or Firm—Clarence A. O'Brien; Harvey B. Jacobson

[57] ABSTRACT

A cable splice housing particularly useful for telephone cables has a hollow, tubular, plastic body, opposite sides of which are heat sealed together at one end thereof. A plug fits in snug mating relationship in the other end and has holes extending axially therethrough for the cables. A clamp is provided around the hollow body for clamping the latter around the plug, and the housing is filled with grease when in use.

3 Claims, 4 Drawing Figures

U.S. Patent  Oct. 5, 1976  3,984,623
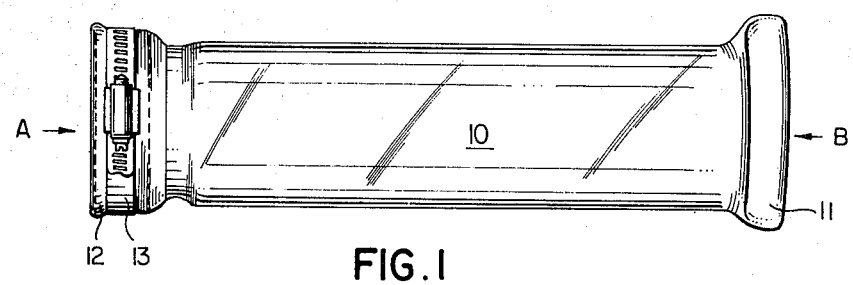
FIG.1
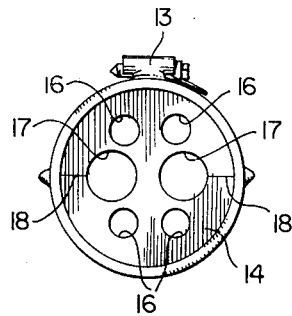
FIG.2.
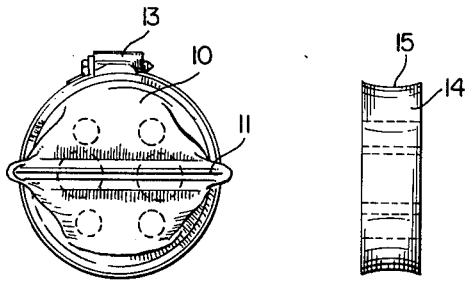 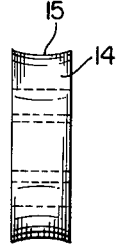
FIG.3.  FIG.4.

CABLE SPLICE HOUSING

The present invention relates to cable splice housings, and is useful, in particular, as a communication housing for use in connection with telephone cables.

In the past, telephone cables have been spliced and the splice has been enclosed in a lead sleeve or a butyrate tube having several different tapes at one end thereof to seal the cables, the sleeve or tube subsequently being injected with grease. The use of the different tapes for sealing purposes was expensive and inconvenient. Furthermore, when access was required to the connections, the lead sleeve or butyrate tape tubing, and the tapes, were discarded and had to be replaced by new sleeves or tubes and tapes.

It is an object of the present invention to provide an improved cable splice housing which is inexpensive to manufacture and install.

According to the present invention, there is provided a cable splice housing comprising a tubular body portion of elongate shape, the hollow body portion being of plastic material, and of generally tubular shape, opposite sides of the hollow body portion being sealed together at a first end of the hollow body portion to sealingly close said first end, a plug for insertion into the opposite end of the hollow body portion, the plug having a transverse cross-sectional shape and size corresponding to those of the hollow body portion at said opposite end, whereby the plug fits in snug mating relation into said opposite end, means defining a plurality of holes extending through the plug in the axial direction of the housing, and clamp means for sealingly clamping the opposite end of the hollow body portion around the plug.

Preferably, a transverse heat seal between opposed sides of the wall of the hollow body portion sealingly closes the first end thereof, the heat seal extending across the width of the hollow body portion.

The invention will be more readily understood from the following description of a preferred embodiment thereof given, by way of example, with reference to the accompanying drawing, in which:

FIG. 1 shows a side view of a cable splice housing;

FIG. 2 shows an end view of the housing of FIG. 1, taken in the direction of arrow A of FIG. 1;

FIG. 3 shows an opposite end view taken in the direction of arrow B of FIG. 1; and FIG. 4 shows a side view of a plug.

The cable splice housing illustrated in the accompanying drawing comprises a tubular hollow body in the form of a tube 10 made of flexible polyvinylchloride. The right-hand end of the tube 10, as viewed in FIG. 1, is sealingly closed by means of a transverse heat seal 11, which extends across the width of the tube 10 and seals together opposite side walls of the tube 10.

The other end of the tube 10 is formed with a widened, cylindrical mouth 12, around which extends a hose clip 13.

A cylindrical plug 14 is inserted into the mouth 12 and, when the splice housing is in use, the plug 14 is retained in clamped condition in the mouth 12, and is clamped around cables extending through the plug 14, by tightening the hose clip 13. It will be understood from this that the plug 14 has a transverse cross-sectional circular shape and size corresponding to those of the interior of the mouth 12. Also, the outer surface of the plug 14 is formed with a peripheral concavity, indicated by reference numeral 15 in FIG. 4, which ensures that the plug is retained securely in position in the mouth 12 after the clip 13 is tightened.

The relatively wide mouth receives the plug 14, but the remainder of the tube is of smaller diameter, so that insertion of the plug is limited.

A plurality of holes extend through the plug 14 in the axial direction of the tube 10. These holes include four holes 16 and two further holes 17, the holes 17 being of larger diameter than the holes 16. Between the outermost portions of the holes 17 and the outer periphery of the plug 14, the plug 14 is split, throughout the length of the plug, along lines indicated by reference numerals 18.

The plug 14 is of polyvinylchloride, but may alternatively be of, for example, neoprene, and of durometer hardness 70 shore A, and is sufficiently flexible to enable the portions of the plug on opposite sides of the lines 18 to be bent apart, on removal of the plug from the tube 10, so as to form gaps between the periphery of the plug 14 and the holes 17 to facilitate insertion of cables into the holes 17, as described in greater detail hereafter.

When the above-described cable splice housing is in use, cables extend through the holes 16 and 17 into the interior of the tube 10, where they are connected together and surrounded by a filling of suitable grease of the type well known in the art.

Normally, the cable splice housing will be supplied with a filling of grease and with the plug 14 inserted into the mouth 12. When the cable splice housing is to be used, the hose clip 13 is firstly loosened, to allow removal of the plug 14 from the tube 10.

The above-described cable splice housing is particularly intended for connecting telephone subscriber drops in buried cable installations in subdivisions where access may be required for trouble-shooting or minor rearrangements. For this purpose, a loop of slack cable, left either in a service box or in a ditch in a direct buried cable, has its insulation removed along a portion thereof, and insulated portions of the cable at opposite ends of the loop are then pressed radially of the plug 14, through gaps formed along the lines of separation 18 as mentioned above, into the holes 17. The ends of the loop are then connected together by a metal connector of conventional type, a coil wrap is removed from the cable loop, and the cable is separated into separate wires. A service wire is then inserted through one of the holes 16 and connected to appropriate wires of the firstmentioned cable, and this process is repeated for other individual cables inserted through the upper holes 16. The spliced and other wires of the loop are then tied together in a neat bundle, and inserted into the grease-filled interior of the tube 10 until the plug 14 is nested in the mouth 12. To complete the splice, the hose clip 13 is then tightened to clamp the plug 14 within the mouth 12.

The above-described cable splice housing is made from a tube of polyvinylchloride, of durometer hardness 70 shore A, by heating opposite ends of the tube to a temperature of appoximately 500°F, using glycerine, and then clamping opposite sides of the tube at one end of the tube to form the heat seal 11 and inserting a die into the other end of the tube to form the mouth 12, an external clamp being placed around the tube adjacent the mouth end during this operation.

It will be appreciated that various modifications may be made in the above-described housing. For example, the relative dimensions of the housing may be varied, in accordance with the intended use of the housing, and also the number and disposition of the holes in the plug 14 may be varied. For some applications, it is not necessary to split the plug 14 along the lines 18. Preferably, the tube 10 has a wall thickness of 3/16 inch, and the housing may be e.g. 6 to 20 inches in length, 1¾ to 4¼ inches in internal diameter, and 2⅛ to 4⅝ inches in external diameter while the plug 14 may have a length of e.g. ¾ to 1½ inches, longitudinally of the housing.

I claim:

1. A cable splice housing, comprising:
   a generally cylindrical hollow body portion made of plastic material;
   means forming a transverse seal between opposite sides of said hollow body portion at a first end thereof to sealingly close said first end;
   a cylindrical plug inserted into the opposite end of said hollow body portion, said cylindrical plug having a diameter substantially equal to the internal diameter of said one end of said hollow body portion, whereby said plug fits in mating relating into said opposite end of said hollow body portion;
   means defining a plurality of holes extending through said plug in the axial direction of said cylindrical housing body portion; and
   clamp means extending around the exterior of said opposite end of said hollow body portion sealingly clamping said opposite end into tight engagement around said plug, and the interior diameter of said opposite end of said hollow body and the diameter of said plug are larger than the interior diameter of the remainder of said hollow body, whereby the extent of insertion of said plug into said hollow body is limited, and said plug is formed with a peripheral recess, whereby said clamp means are tightenable to compress said opposite end of said hollow body into secure gripping engagement with said plug.

2. A cable splice housing as claimed in claim 1, wherein said plug is axially split between at least one of said holes and the periphery of said plug and is sufficiently resilient to be manually deformed for insertion of a cable laterally of said plug through the split into said hole.

3. A cable splice housing, comprising:
   a generally cylindrical hollow body portion made of plastic material;
   means forming a transverse seal between opposite sides of said hollow body portion at a first end thereof to sealingly close said first end;
   a cylindrical plug inserted into the opposite end of said hollow body portion, said cylindrical plug having a diameter substantially equal to the internal diameter of said one end of said hollow body portion, whereby said plug fits in mating relating into said opposite end of said hollow body portion;
   means defining a plurality of holes extending through said plug in the axial direction of said cylindrical housing body portion;
   clamp means extending around the exterior of said opposite end of said hollow body portion sealingly clamping said opposite end into tight engagement around said plug, and the interior diameter of said opposite end of said hollow body and the diameter of said plug are larger than the interior diameter of the remainder of said hollow body, whereby the extent of insertion of said plug into said hollow body is limited, said sealing means comprise a transverse heat seal between said opposite sides of the wall of said hollow body portion, said transverse heat seal extending across the width of said hollow body portion, and wherein said plug includes means defining a concavity extending around the periphery of said plug between the ends thereof, said clamp means being tightenable to urge a portion of said opposite end of said hollow body portion into said concavity for grippingly retaining said plug.

* * * * *